INVENTOR
JACK H. BEARD

Oct. 18, 1966  J. H. BEARD  3,279,292
SHEAR MACHINE WITH MEANS TO DRIVE SHEAR IN RESPONSE
TO PRESSURE BUILD-UP IN GAG RAM DRIVE
Filed Oct. 14, 1964  3 Sheets-Sheet 2

INVENTOR
JACK H. BEARD
BY
Henry C. Westin
HIS ATTORNEY

INVENTOR
JACK H. BEARD
By
Henry C. Westin
HIS ATTORNEY

United States Patent Office 3,279,292
Patented Oct. 18, 1966

3,279,292
SHEAR MACHINE WITH MEANS TO DRIVE SHEAR IN RESPONSE TO PRESSURE BUILD-UP IN GAG RAM DRIVE
Jack Herbert Beard, Sheffield, England, assignor to Davy and United Engineering Company Limited, Sheffield, England
Filed Oct. 14, 1964, Ser. No. 403,723
Claims priority, application Great Britain, Oct. 18, 1963, 41,260/63
4 Claims. (Cl. 83—380)

This invention relates to shears particularly of the down and upcut type. In shears of this type, the upper blade is driven towards the workpiece to be cut and the lower blade is then forced to rise towards the upper blade, so that the workpiece is sheared between the two blades.

In our British specification No. 19,996/62 we have described a down and upcut shear, in which the upper blade is driven to a position adjacent a slab to be cut by a double-acting auxiliary piston and cylinder assembly and in which the upper blade is held in that position for the shearing operation by a main cylinder which, during the shearing stroke, is sealed. The specification also describes a gag which is downwardly biased by a further piston and cylinder assembly.

The present invention provides a shear in which the upper blade is driven downwards by the gag cylinder and ram assembly.

The present invention provides a shear having independent first and second blade holders, means for guiding the holders along parallel paths towards and away from a workpiece to be sheared, a single acting return piston and cylinder assembly coupled to the first blade holder to effect withdrawal of that blade holder away from a workpiece, a gag mounted for movement parallel to the first bladeholder, a gag piston and cylinder assembly arranged to drive the gag towards the second blade holder, the gag and first blade holder being arranged to abut one another such that movement of the gag towards the second blade holder drives the first blade holder in that direction, while the gag is free to move relative to the first blade holder in the other direction, and movement of the first blade holder away from a workpiece drives the gag in that direction, and a power piston and cylinder assembly arranged to drive the second blade holder towards the first blade holder to effect a shear.

Preferably, in operation, the return ram and cylinder assembly is continuously supplied with liquid under pressure to bias the first blade holder away from the second blade holder; in that event, the gag piston and cylinder assembly is supplied with liquid at a sufficiently high pressure to move the gag and the first blade holder against the bias of the return assembly when it is desired to initiate a shear operation. An embodiment of shear and hydraulic control circuit therefor, in accordance with the invention, will now be described, by way of example only, with reference to the accompanying drawings of which:

Figure 1:
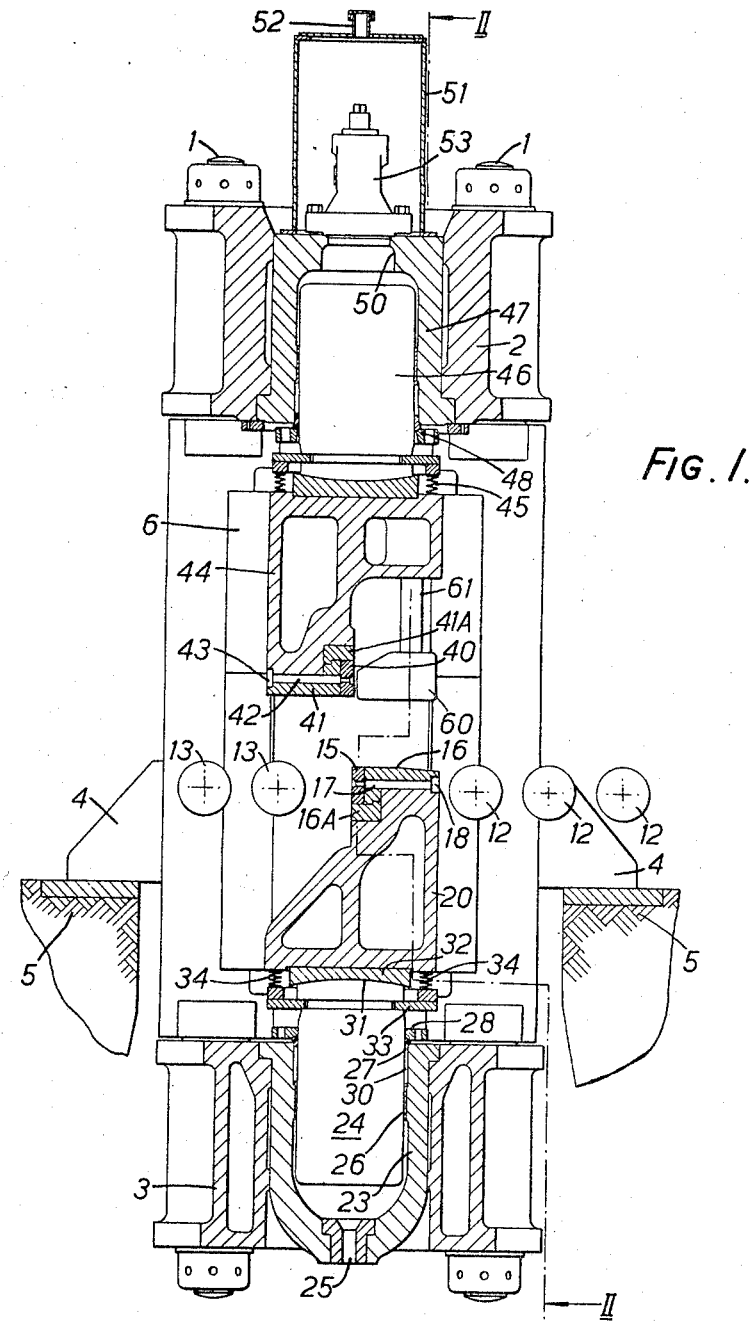
FIGURE 1 is a vertical section through the shear, on the line I—I of FIGURE 2.
Figure 2:
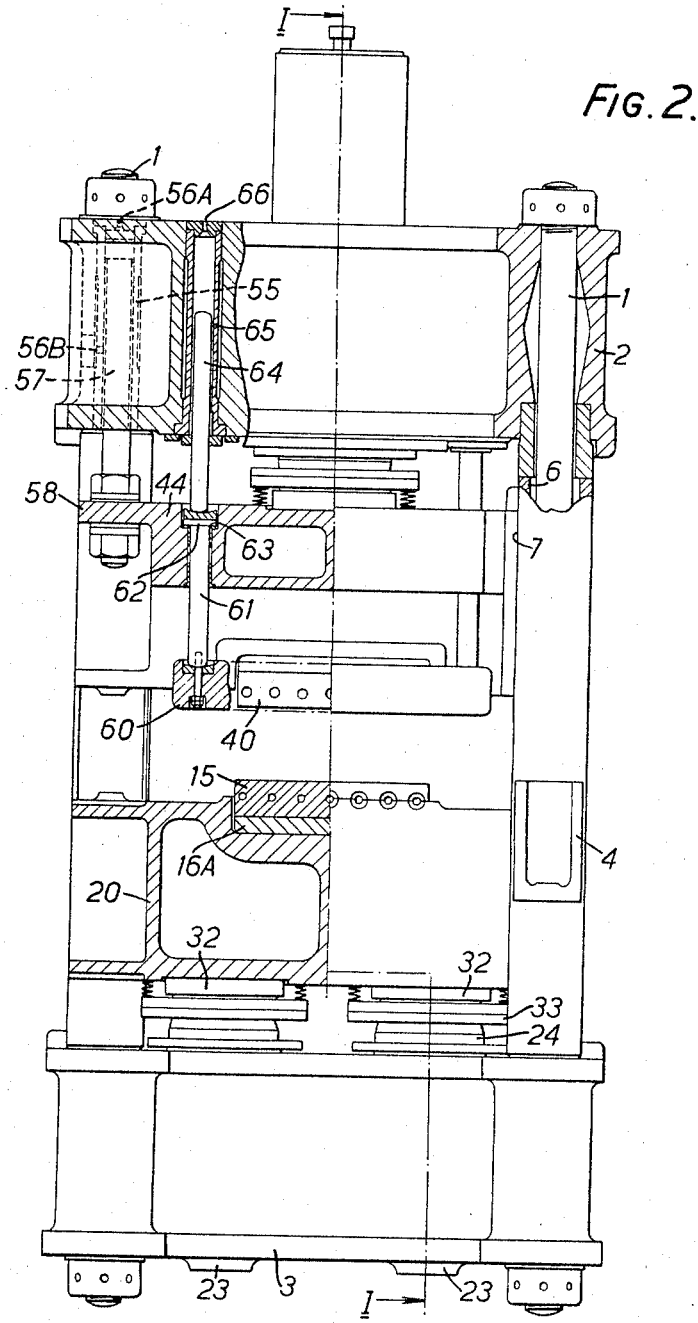
FIGURE 2 is a side view of the shear, the left hand half of the figure being in part a section on the line II—II of FIGURE 1.

Referring to FIGURES 1 and 2, the shear has four columns 1 which are tied together by an upper fixed crosshead 2 and a lower fixed crosshead 3. Each of the columns 1 has a bracket 4 enabling the shear to be bolted down to the foundations 5, with the lower part of the shear in a well. Between the crossheads 2, 3 the columns 1 are connected by a shear frame 6 having slideways 7, for guiding the two blade holders. Rollers 12 form part of the entry roller table and rollers 13 part of the exit roller table, by which the workpieces to be sheared and the sheared workpieces are conveyed to and from the shear.

The lower shear blade 15 of the shear is located on the lower blade seats 16, 16a by screws 17 and nuts 18, none of which project beyond the sides of the blade or its seats. The blade seats are attached to a blade holder 20 the ends of which slide in the slideways 7.

The lower crosshead 3 carries two similar hydraulic cylinders 23, each of which has a ram 24 and a port 25 for the supply of oil under pressure. As the two cylinders and rams are similar, only one will be described in detail. Thus the cylinder 23 has a guide bush 26 located between it and the ram 24. A further guide bush 27 is retained at the lip of the cylinder by an annular cap 28 bolted to the end of the cylinder. There is a hydraulic seal 30 between the bushes 26, 28.

The ram 24 projects from the cylinder 23 and has a convex part-spherical end surface 31 mating with a similar, but concave, surface on a spherical seating 32. A ring 33 is located in a slot in the projecting part of ram 24 and is connected to the blade holder 20 by 34 which holds the blade holder on the seating 32. On supply of liquid under pressure through the port 25, the blade holder 20 and the blade 15 are driven upwardly from the rest position illustrated, in order to shear the workpiece. The seatings 32 permit a degree of tilting of the blade holder to accommodate unequal loading.

An upper blade 40, secured in blade seats 41, 41a by screws 42 and nuts 43, lies above the rollers 12, 13 and is attached to the upper blade holder 44. This blade holder is connected to the ram 46 of a cylinder 47 carried centrally by the upper crosshead 2; the general construction of the cylinder 47 and ram 46 and the mode and connection of the ram 46 to the blade holder 44 are identical with those of the cylinder 23 and ram 24 and further description is unnecessary. The cylinder 47 is held in position in the croshhead 2 by a ring 48 bolted to the crosshead 2, and has an enlarged valve opening 50 at its upper end. The cylinder 47 also carries a tank 51 having a breather 52. Inside the tank 51 and mounted on the cylinder 47 over opening 50 is a non-return valve 53.

The upper crosshead 2 also carries on its centre line a pair of single acting return cylinders and rams. One of the cylinders is shown in FIGURE 2 at 55, the supply port for the operating liquid being indicated at 56b, while port 56a is vented to atmosphere. The ram 57 is bolted to a projecting flange 58 of the blade holder 44.

A gag 60 is situated immediately above the lower blade 15, and blade seat 16 with its lower face below the level of the upper blade 40. The gag 60 is carried on a pair of rods 61, one of which is shown in FIGURE 2, passing through the blade carrier 44 and carrying at their upper ends abutments 62 which seat on annular shoulders 63 formed in the carrier blade 44. The abutments 62 are normally held against their seats, so that downward movement of the gag 60 moves the upper blade 44 downwards while upward movement of the blade holder 44 moves the gag upwards. The gag is arranged to be driven downwards by piston rods 64 sliding in cylinders 65 which are carried by the upper crosshead 2 and which are supplied with liquid under pressure through ports 66. Any one such cylinder 65 is shown in FIGURE 2 but it will be understood that the other is identical. As a result, the gag and upper blade holder normally move together, but the gag can move upwardly relative to the blade carrier 44 and against the bias applied by the liquid in the cylinder 65 when shearing occurs.

While the valve 53 normally acts as a non-return valve, means are provided to open it to exhaust the cylinder 47.

Figure 3:
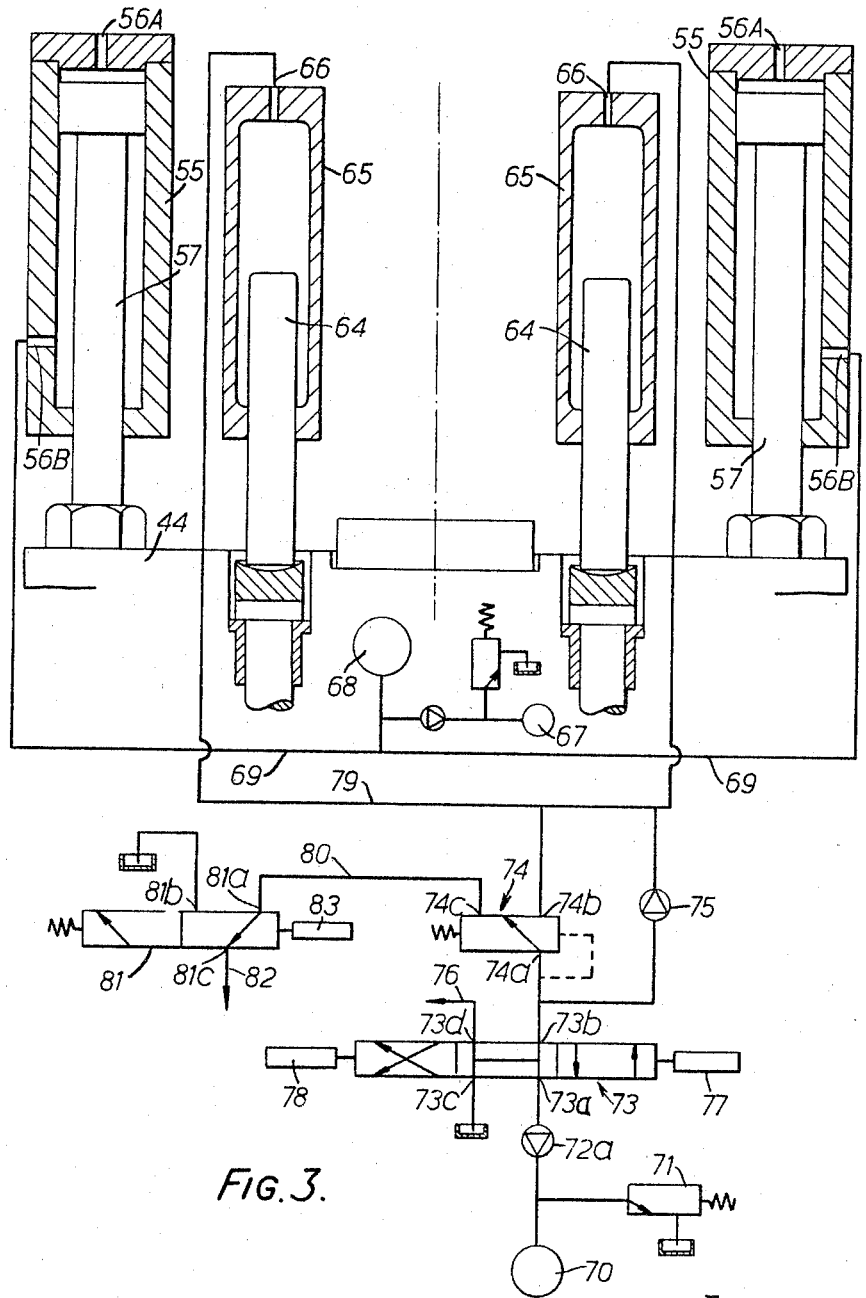
FIGURE 3 shows a hydraulic control circuit.

FIGURE 3 shows the hydraulic supply circuits and the return piston and cylinder assemblies 55, 57 and the gag piston and cylinder assemblies 64, 65. A pump 67 is connected to supply fluid to an accumulator 68 which is connected via lines 69 to the inlet ports 56b of the return cylinders 55. A separate pump 70 having a relief valve 71 supplies fluid via valve 72 to the port 73a of a main control valve 73. Port 73b of valve 73 is connected to port 74a of a sequence valve 74 and to one side of a check valve 75. Port 73c of valve 73 is connected to a reservoir and port 73d is connected via a line 76 to a control port of the prefilling and exhaust valve 53, such that supply of pressurised fluid on line 76 opens the valve 53. In its non-energised state the main control valve 73 has all its ports connected together, while energisation of solenoid 77 connects port 73a with port 73b and port 73c with port 73d, and energisation of solenoid 78 connects port 73a with port 73d and port 73c with port 73b.

The other side of the check valve 75 and port 74b of the pressure sequence valve 74 are both connected via line 79 to the ports 66 of the gag cylinders 65. Port 74c of the pressure sequence valve 74 is connected by line 80 to port 81a of a bottom knife control valve 81. Port 81b of valve 81 is connected to a reservoir while port 81c is connected by line 82 to the bottom knife cylinders 23. The valve 81 is normally biased to a position in which ports 81b and 81c are connected, while energisation of solenoid 83 disconnects port 81c from port 81b and connects it to port 81a.

In operation pump 67 supplies fluid to the accumulator 68 whose sole purpose is to supply a permanent upward bias to the top blade holder by supplying pressurised fluid to the return ram cylinders 55 via ports 56, while ports 56a are vented to the atmosphere.

Pump 70 supplies fluid for the bottom blade cylinders, the gag rams and the prefilling and exhaust valve 53 of the top blade cylinder.

To shear a workpiece, solenoids 77 and 83 are energised. Pressurised oil is thus directed via the main control valve 73 and the pressure sequence valve 74 to the gag rams, forcing the gag downwardly and carrying the top blade holder with it. Fluid from the top blade holder return cylinders is forced back to the accumulator 68. Water passes to the top knife holder main cylinder via the prefilling valve 53 in known manner.

When the gag reaches the workpiece to be cut, pressure in the gag cylinders rises and fluid from the pump 70 is directed by the pressure sequence valve 74 to the bottom blade cylinders via the bottom blade control valve 81. The sequence valve maintains full pressure in the gag rams.

When the bottom knife has completed its approach stroke, it begins to shear a workpiece and the sheared part is carried upwardly by the bottom knife, pushing the gag rams upwardly. Oil from the gag rams passes to the ingoing side of the sequence valve via the check valve 75 thus joining the fluid flow from pump 70 to the bottom blade cylinders.

When the bottom blade reaches the top of its stroke, a limit switch de-energises solenoid 83 thus releasing fluid from the bottom knife cylinders. Fluid will again pass to the gag rams via the sequence valve and the bottom blade will be pushed downwardly by the gag rams.

When the bottom knife reaches the bottom of its stroke, a limit switch energises solenoid 78 and de-energises solenoid 77. Fluid now passes to the tank from the gag cylinders via the check valve and the main control valve and the prefilling and exhaust valve is now open in known manner by fluid flow from pump 70 on line 76. Constant pressure from the accumulator now lifts the top knife carrying the gag with the top knife and pushing the gag rams upwardly.

A further limit switch will de-energise solenoid 78 when the shear is opened sufficiently, thus releasing the operating fluid from the prefilling and exhaust valve and unloading the pump 70. The prefilling and exhaust valve will then close and stop the upwards travel of the top blade. The pressure of liquid supplied by pump 70 to the gag cylinders is such that the bias applied to the return ram cylinders by accumulator 68 can be overcome by the gag rams.

I claim:

1. A shear having first and second fixed crossheads associate with independent first and second blade holders, means for guiding the holders along parallel paths towards and away from a workpiece to be sheared, a return single acting piston and cylinder assembly coupled to the first blade holder to effect withdrawal of that blade holder away from the second blade holder, a gag mounted for movement parallel to the first blade holder, a gag piston and cylinder assembly mounted on the first crosshead and coupled to the gag to drive the gag towards the second blade holder, the gag and first blade holder abutting one another such that movement of the gag towards the second blade holder drives the first blade holder with it in that direction while the gag is free to move relative to the first blade holder in the opposite direction, and movement of the first blade holder away from the second blade holder drives the gag with it in that direction, and a power piston and cylinder assembly mounted on the second crosshead and adapted to drive the second blade holder towards the first blade holder to effect a shear.

2. A shear according to claim 1 including a further piston and cylinder assembly connected to the first blade holder and means for sealing the further cylinder when the first blade holder is adjacent a workpiece to be sheared to trap liquid between the first blade holder and the first crosshead so as to resist movement of the first blade holder towards the first crosshead.

3. A shear according to claim 1 including means for applying a permanent bias to the return cylinder and ram assembly and means for supplying pressurised fluid to the gag piston and cylinder assembly at a sufficiently high pressure to move the gag and the first blade holder against the bias of the return piston and cylinder assembly.

4. A shear according to claim 1 in which the gag piston and cylinder assembly and the power piston and cylinder assembly are arranged to be supplied from a common source of pressurised fluid, and rise of pressure in the gag cylinders when the gag contacts the workpiece is arranged to direct fluid from that source to the power cylinder.

References Cited by the Examiner
UNITED STATES PATENTS 3,066,566  12/1962  Bottenhorn _____ 83—623
3,137,191   6/1964  O'Brien _____83—623 X
3,152,499  10/1964  Moelbert _____ 83—51

ANDREW R. JUHASZ, *Primary Examiner.*